(12) United States Patent
Yao et al.

(10) Patent No.: US 12,381,606 B2
(45) Date of Patent: Aug. 5, 2025

(54) SYSTEMS AND METHODS FOR ACTIVATING BEAM STATE IN WIRELESS COMMUNICATION SYSTEMS

(71) Applicant: ZTE CORPORATION, Guangdong (CN)

(72) Inventors: Ke Yao, Shenzhen (CN); Bo Gao, Shenzhen (CN); Chuangxin Jiang, Shenzhen (CN); Zhaohua Lu, Shenzhen (CN); Shujuan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 72 days.

(21) Appl. No.: 18/488,593

(22) Filed: Oct. 17, 2023

(65) Prior Publication Data
US 2024/0113753 A1 Apr. 4, 2024

Related U.S. Application Data

(63) Continuation of application No. PCT/CN2021/107080, filed on Jul. 19, 2021.

(51) Int. Cl.
*H04L 5/12* (2006.01)
*H04B 7/0426* (2017.01)
*H04B 7/0456* (2017.01)

(52) U.S. Cl.
CPC .......... *H04B 7/0456* (2013.01); *H04B 7/043* (2013.01)

(58) Field of Classification Search
CPC ..... H04B 7/0456; H04B 7/043; H04B 7/0639
USPC ........................................................ 375/262
See application file for complete search history.

(56) References Cited

U.S. PATENT DOCUMENTS

| | | | | |
|---|---|---|---|---|
| 2020/0007208 A1* | 1/2020 | Zhou | ................ | H04B 7/0617 |
| 2020/0044797 A1* | 2/2020 | Guo | ................ | H04L 5/0094 |
| 2020/0106645 A1* | 4/2020 | Tsai | ................ | H04B 7/0874 |
| 2021/0345429 A1* | 11/2021 | Zhou | ................ | H04B 7/0665 |
| 2021/0360594 A1* | 11/2021 | Park | ................ | H04L 5/0048 |

(Continued)

FOREIGN PATENT DOCUMENTS

| WO | WO-2021/093176 A1 | 5/2021 |
|---|---|---|
| WO | WO-2021/109449 A1 | 6/2021 |

OTHER PUBLICATIONS

CATT, "Enhancements on multi-beam operation", 3GPP TSG RAN WG1 #105-e, R1-2104484, May 27, 2021, e-Meeting (12 pages).

(Continued)

*Primary Examiner* — Helene E Tayong
(74) *Attorney, Agent, or Firm* — Foley & Lardner LLP

(57) ABSTRACT

Systems and methods for wireless communication systems are disclosed. In one aspect, the wireless communication method includes receiving, by a wireless communication device from a network, first signaling. The first signaling activates one or more beam state codepoints, each of the one or more beam state codepoints includes one or more beam states for a direction. The direction includes downlink, uplink or both downlink and uplink. The method further includes determining, by the wireless communication device, at least one beam state according to the one or more beam state codepoints, and applying, by the wireless communication device, the at least one beam state to a target transmission based on the direction of the at least one beam state. The target transmission includes at least one of a downlink transmission or an uplink transmission.

19 Claims, 12 Drawing Sheets

(56) References Cited

U.S. PATENT DOCUMENTS

| | | | |
|---|---|---|---|
| 2021/0368486 A1* | 11/2021 | Jin | H04W 72/046 |
| 2021/0385056 A1* | 12/2021 | Zhou | H04W 72/23 |
| 2022/0109487 A1* | 4/2022 | Guo | H04L 5/0023 |
| 2023/0262703 A1* | 8/2023 | Chen | H04B 7/0695 |
| | | | 370/329 |

OTHER PUBLICATIONS

Ericsson, "Enhancements on Multi-beam Operation", 3GPP TSG-RAN WG1 Meeting #105-e, Tdoc R1-2105828, May 27, 2021, e-Meeting (31 pages).

Moderator (CATT), "Moderator summary #2 on M-TRP simultaneous transmission with multiple Rx panels", 3GPP TSG RAN WG1 #104b-e, R1-2103906, Apr. 20, 2021, e-Meeting (38 pages).

Moderator (Samsung), "Moderator summary for multi-beam enhancement", 3GPP TSG RAN WG1 #105-e, R1-2105290, May 27, 2021, e-Meeting (67 pages).

Nokia et al., "Enhancements on Multi-beam Operation", 3GPP TSG RAN WG1 #105-e, R1-2105273, May 27, 2021, e-Meeting (44 pages).

Oppo, "Enhancements on Multi-Beam Operation", 3GPP TSG RAN WG1 #105-e, R1-2104732, May 27, 2021, e-Meeting (18 pages).

Qualcomm Incorporated, "Enhancements on Multi-beam Operation", 3GPP TSG RAN WG1 Meeting #105-e, R1-2104654, May 27, 2021 (15 pages).

ZTE, "Enhancements on Multi-beam Operation", 3GPP TSG RAN WG1 Meeting #105-e, R1-2104585, May 27, 2021, e-Meeting (24 pages).

Asia Pacific Telecom et al.: "Discussion on Enhancements for Multi-beam Operation" 3GPP TSG RAN WG1 #105-e; R1-2105816; May 27, 2021; e-Meeting (12 pages).

Asia Pacific Telecom et al.: Discussion on enhancements for Multi-beam Operation 3GPP TSG RAN WG1 #104bis-e; R1-2102725; Apr. 20, 2021; e-Meeting (11 pages).

International Search Report and Written Opinion for PCT Appl. No. PCT/CN2021/107080, mailed Dec. 29, 2021 (8 pages).

* cited by examiner

| Number of codepoints for DL | Number of codepoints for UL | Number of codepoints for combined DL and UL | Num of combinations |
|---|---|---|---|
| 0 | 0 | 0, 1, ..., 8 | 9 |
| 0 | 1 | 0, 1, ..., 7 | 8 |
| ... | ... | ... | ... |
| 0 | 4 | 0, 1, ..., 4 | 5 |
| 0 | 5 | 0, 1, ..., 3 | 4 |
| ... | ... | ... | ... |
| 0 | 8 [or up to 4]* | 0 | 1 |
| 1 | 0 | 0, 1, ..., 7 | 8 |
| 1 | 1 | 0, 1, ..., 6 | 7 |
| ... | ... | ... | ... |
| 1 | 7 [or up to 4]* | 0 | 1 |
| 2 | 0 | 0, 1, ..., 6 | 7 |
| ... | ... | ... | ... |
| 2 | 6 | 0 | 1 |
| 3 | 0 | 0, 1, ..., 5 | 6 |
| ... | ... | ... | ... |
| 3 | 5 | 0 | 1 |
| ... | ... | ... | ... |
| 8 | 0 | 0 | 1 |
| | | | Sum: 165 [or 145] |

| Number of codepoints for DL | Number of codepoints for UL | Number of combinations |
|---|---|---|
| 0 | 0, 1, ..., 8 [or up to 4] | 9 [or 5] |
| 1 | 0, 1, ..., 7 [or up to 4] | 8 [or 5] |
| .. | | |
| 8 | 0 | 1 |
| | | Sum: 45 [or 35] |

1202 — Transmit, to a wireless communication device, first signaling, wherein the first signaling activates one or more beam state codepoints, each of the one or more beam state codepoints comprises one or more beam states for a direction, and the direction comprises downlink, uplink or both downlink and uplink 1204 — Communicate, with the wireless communication device, a target transmission by applying at least one beam state based on the direction, wherein the target transmission comprises at least one of a downlink transmission or an uplink transmission

FIG. 12

SYSTEMS AND METHODS FOR ACTIVATING BEAM STATE IN WIRELESS COMMUNICATION SYSTEMS

CROSS-REFERENCE TO RELATED APPLICATION

This application claims the benefit of priority under 35 U.S.C. § 120 as a continuation of International Patent Application No. PCT/CN2021/107080, filed on Jul. 19, 2021, the disclosure of which is incorporated herein by reference in its entirety.

TECHNICAL FIELD

The disclosure relates generally to wireless communication, including but not limited to systems and methods for activating beam states in wireless communication systems.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions (NFs), have been simplified with some of them being software based so that they could be adapted according to need.

SUMMARY

In one aspect, a wireless communication method includes receiving, by a wireless communication device from a network, first signaling. The first signaling activates one or more beam state codepoints, each of the one or more beam state codepoints includes one or more beam states for a direction. The direction includes downlink (DL), uplink (UL), or both downlink and uplink. The method further includes determining, by the wireless communication device, at least one beam state according to the one or more beam state codepoints, and applying, by the wireless communication device, the at least one beam state to a target transmission based on the direction of the at least one beam state. The target transmission includes at least one of a downlink transmission or an uplink transmission.

In some embodiments, the first signaling includes a Medium Access Control (MAC) Control Element (CE).

In some embodiments, the method further includes determining one of a plurality of candidate types for each of the one or more beam state codepoints.

In some embodiments, the candidate type includes at least one of DL, UL, combined DL and UL, or joint DL and UL.

In some embodiments, the one or more beam state codepoints are organized in a predefined order according to the plurality of candidate types.

In some embodiments, the method further includes determining a number of at least some of the one or more beam state codepoints for a type of a plurality of candidate types.

In some embodiments, the number of the some of the one or more beam state codepoints for each type of the plurality of candidate types is indicated using an integer.

In some embodiments, the numbers of the one or more beam state codepoints for all of the plurality of candidate types are jointly indicated using an integer.

In some embodiments, the numbers of the one or more beam state codepoints for some of the plurality of candidate types are jointly indicated using an integer.

In some embodiments, one or more numbers of one or more first beam state codepoints of the one or more beam state codepoints for one or more first candidate types of the plurality of candidate types are jointly indicated using an integer, and a number of the one or more first candidate types is less than a number of the plurality of candidate types.

In some embodiments, the one or more first beam state codepoints are before the one or more second beam state codepoints according to the predefined order. The one or more second beam state codepoints are beam state codepoints other than the one or more first beam state codepoints in the first signaling.

In some embodiments, the first signaling includes a presence indicator corresponding to a first one of the one or more beam state for a direction in a corresponding beam state codepoint, the presence indicator indicates a presence of a second beam state with the same direction in the same beam state codepoint; Or the first signaling includes the presence indicator corresponding to each of the one or more beam states for a direction in a corresponding beam state codepoint, the presence indicator indicates a presence of another beam state with the same direction in the same beam state codepoint.

In some embodiments, the determining the at least one beam state according to the one or more beam state codepoints includes determining the at least one beam state based on a first pointer. The first pointer includes at least one of: a pointer for the downlink transmission or a pointer for the uplink transmission; or the first pointer includes a pointer for both the downlink transmission and the uplink transmission.

In some embodiments, the at least one beam state is determined as at least one beam state corresponding to a beam state codepoint with a codepoint identifier (ID) determined by the first pointer.

In some embodiments, the first pointer is determined by at least one of values as: a predefined or configured integer; an indicated value related to beam state in a downlink control information (DCI); a lowest or a first codepoint ID in the one or more codepoint IDs in the first signaling; a highest or a last codepoint ID in the one or more codepoint IDs in the first signaling; a codepoint ID corresponds to a first or a last beam state codepoint of the one or more beam state codepoints having a combined downlink and uplink type or a joint downlink and uplink type in the first signaling; a codepoint ID corresponds to a first or a last beam state codepoint of the one or more beam state codepoints having an uplink type, a combined downlink and uplink type, or a joint downlink and uplink type in the first signaling; or a codepoint ID corresponds to a first or a last beam state codepoint of the one or more beam state codepoints having a downlink type, a combined downlink and uplink type, or a joint downlink and uplink type in the first signaling.

In some embodiments, the first pointer is determined by the at least one of values when or after an applicable time of the first signaling; or the first pointer is determined by the at least one of values starting from the first slot that is after an applicable time of the first signaling.

In some embodiments, the applicable time of the first signaling is determined by at least one of a transmit time of a HARQ-ACK information corresponding to the first signaling or a predefined or configured time period.

In some embodiments, the first pointer is determined by the at least one of values when or after an applicable time of the DCI; or the first pointer is determined by the at least one of values starting from the first slot that is after an applicable time of the DCI.

In some embodiments, the applicable time of the DCI is determined by at least one of a transmit time of a HARQ-ACK information corresponding to the DCI or a predefined or configured time period.

In some embodiments, the method further includes receiving, by the wireless communication device from the network, second signaling and updating the first pointer to a second pointer based on the second signaling.

In some embodiments, the second signaling includes a MAC CE.

In some embodiments, the second pointer is determined by at least one of values as: a predefined or configured integer; a lowest or a first codepoint ID in the one or more codepoint IDs in the second signaling; a highest or a last codepoint ID in the one or more codepoint IDs in the second signaling; a codepoint ID corresponds to a first or a last beam state codepoint of the one or more beam state codepoints having a combined downlink and uplink type or a joint downlink and uplink type in the second signaling; a codepoint ID corresponds to a first or a last beam state codepoint of the one or more beam state codepoints having an uplink type, a combined downlink and uplink type, or a joint downlink and uplink type in the second signaling; or a codepoint ID corresponds to a first or a last beam state codepoint of the one or more beam state codepoints having a downlink type, a combined downlink and uplink type, or a joint downlink and uplink type in the second signaling.

In some embodiments, a first number of the one or more beam state codepoints in the first signaling and a second number of one or more beam state codepoints in the second signaling are different; or types of each of the one or more beam state codepoints in the first signaling and types of each of the one or more beam state codepoints in the second signaling are not same.

In some embodiments, a first type of a beam state codepoint corresponding to the first pointer in the first signaling and a second type of a beam state codepoint corresponding to the second pointer in the second signaling are not same.

Another aspect is a wireless communication apparatus including at least one processor and a memory. The at least one processor is configured to read code from the memory and implement a wireless communication method. The method includes receiving, by a wireless communication device from a network, first signaling. The first signaling activates one or more beam state codepoints, each of the one or more beam state codepoints includes one or more beam states for a direction. The direction includes downlink, uplink or both downlink and uplink. The method further includes determining, by the wireless communication device, at least one beam state according to the one or more beam state codepoints; and applying, by the wireless communication device, the at least one beam state to a target transmission based on the direction of the at least one beam state. The target transmission includes at least one of a downlink transmission or an uplink transmission.

Another aspect is a computer program product including a computer-readable program medium code stored thereupon, the code, when executed by at least one processor, causing the at least one processor to implement a wireless communication method. The method includes receiving, by a wireless communication device from a network, first signaling. The first signaling activates one or more beam state codepoints, each of the one or more beam state codepoints includes one or more beam states for a direction. The direction includes downlink, uplink or both downlink and uplink. The method further includes determining, by the wireless communication device, at least one beam state according to the one or more beam state codepoints; and applying, by the wireless communication device, the at least one beam state to a target transmission based on the direction of the at least one beam state. The target transmission includes at least one of a downlink transmission or an uplink transmission.

Another aspect is a wireless communication method, including transmitting, by a network to a wireless communication device, first signaling. The first signaling activates one or more beam state codepoints, each of the one or more beam state codepoints includes one or more beam states for a direction. The direction includes downlink, uplink or both downlink and uplink. The method includes communicating, by the network with the wireless communication device, with the wireless communication device, a target transmission by applying at least one beam state based on the direction. The target transmission includes at least one of a downlink transmission or an uplink transmission.

In some embodiments, the first signaling includes a presence indicator corresponding to a first one of the one or more beam state for a direction in a corresponding beam state codepoint, the presence indicator indicates a presence of a second beam state with the same direction in the same beam state codepoint; or the first signaling includes the presence indicator corresponding to each of the one or more beam states for a direction in a corresponding beam state codepoint, the presence indicator indicates a presence of another beam state with the same direction in the same beam state codepoint.

Another aspect is a wireless communication apparatus including at least one processor and a memory. The at least one processor is configured to read code from the memory and implement a wireless communication method. The method includes transmitting, by a network to a wireless communication device, first signaling. The first signaling activates one or more beam state codepoints, each of the one or more beam state codepoints includes one or more beam states for a direction. The direction includes downlink, uplink or both downlink and uplink. The method further includes communicating, by the network with the wireless communication device, a target transmission by applying at least one beam state based on the direction. The target transmission includes at least one of a downlink transmission or an uplink transmission.

Another aspect is a computer program product including a computer-readable program medium code stored thereupon, the code, when executed by at least one processor, causing the at least one processor to implement a wireless communication method. The method includes transmitting, by a network to a wireless communication device, first signaling. The first signaling activates one or more beam state codepoints, each of the one or more beam state codepoints includes one or more beam states for a direction. The direction includes downlink, uplink or both downlink and uplink. The method further includes communicating, by the network with the wireless communication device, a target transmission by applying at least one beam state based on the direction. The target transmission includes at least one of a downlink transmission or an uplink transmission.

BRIEF DESCRIPTION OF THE DRAWINGS

FIG. 5 illustrates an example table showing a number of combinations of the candidate types, in accordance with some embodiments of the present disclosure.

FIG. 6 illustrates an example table showing a number of combinations of the candidate types, in accordance with some embodiments of the present disclosure.

FIGS. 8, 9, 10, 11, and 12 illustrate flow charts of example wireless communication processes in accordance with some embodiments of the present disclosure.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1. Mobile Communication Technology and Environment

Figure 1:
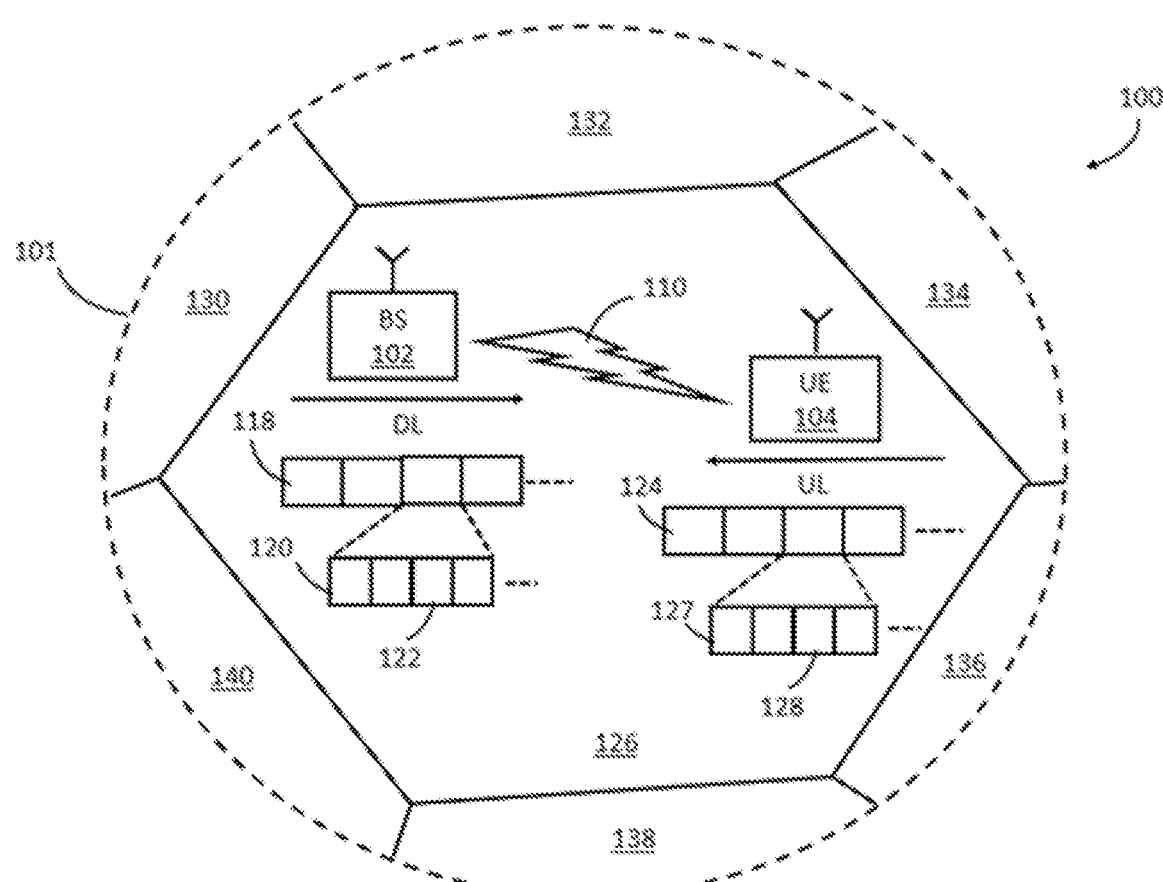
FIG. 1 illustrates an example wireless communication system in which techniques disclosed herein can be implemented, in accordance with some embodiments of the present disclosure.

FIG. 1 illustrates an example wireless communication system 100 in which techniques disclosed herein can be implemented, in accordance with some embodiments of the present disclosure. In the following discussion, the wireless communication system 100 may implement any wireless network, such as a cellular network or a narrowband Internet of things (NB-IoT) network. Such an example system 100 includes a base station (BS) 102 (also referred to as a wireless communication node) and UE 104 (also referred to as a wireless communication device) that can communicate with each other via a communication link 110 (e.g., a wireless communication channel), and a cluster of cells 126, 130, 132, 134, 136, 138 and 140 overlaying a geographical area 101. In some examples, a network refers to one or more BSs (e.g., the BS 102) in communication with the UE 104, as well as backend entities and functions (e.g., a Location Management Function (LMF)). In other words, the network refers to components of the system 100 other than the UE 104. In FIG. 1, the BS 102 and UE 104 are included within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
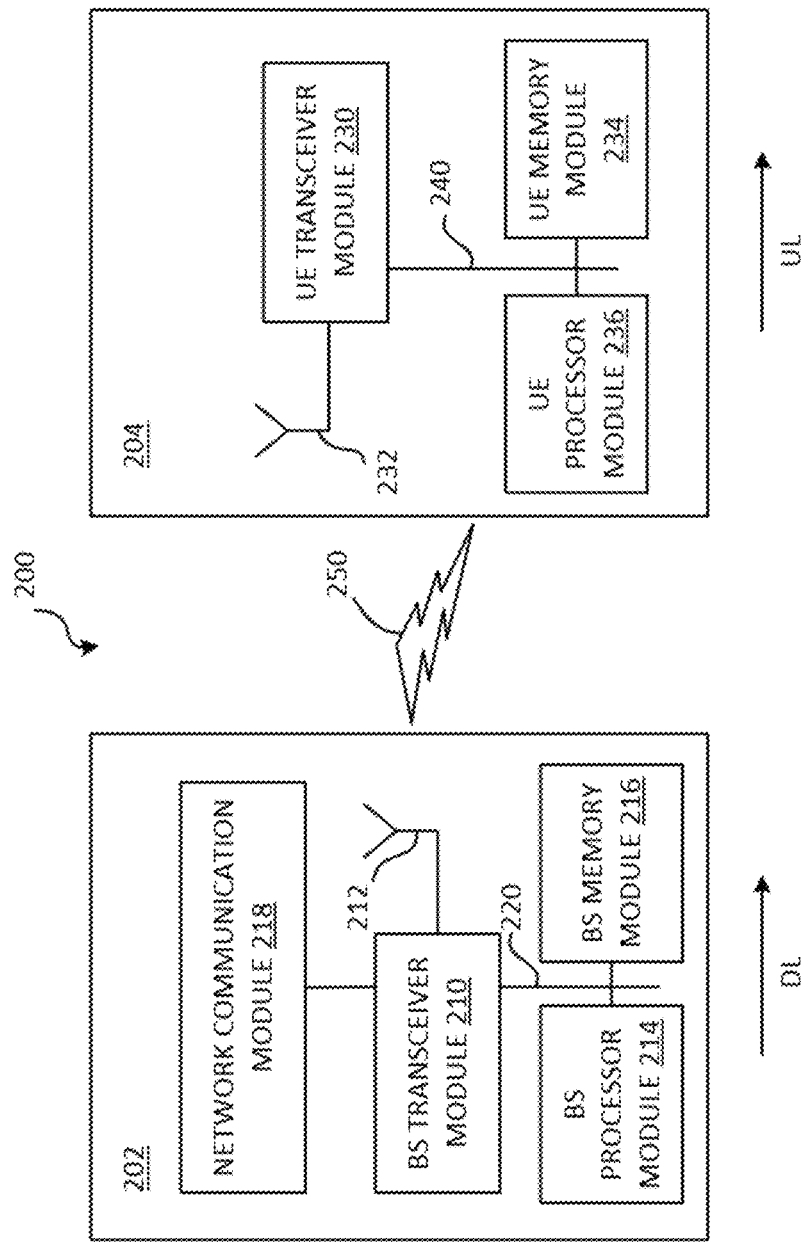
FIG. 2 illustrates a block diagram of an example wireless communication system for transmitting and receiving wireless communication signals (e.g., orthogonal frequency-division multiplexing (OFDM) or orthogonal frequency-division multiple access (OFDMA) signals) in accordance with some embodiments of the present disclosure.

FIG. 2 illustrates a block diagram of an example wireless communication system 200 for transmitting and receiving wireless communication signals (e.g., OFDM or OFDMA signals) in accordance with some embodiments of the present disclosure. The system 200 may include components and elements configured to support known or conventional operating features that need not be described in detail herein. In one illustrative embodiment, system 200 can be used to communicate (e.g., transmit and receive) data symbols in a wireless communication environment such as the system 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each including circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each including circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a MAC layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Activating Beam States

One of the key features of the NR technology of 5G mobile communication systems is the support of high frequency bands. High frequency bands have abundant frequency domain resources, but wireless signals in high frequency bands decay quickly and coverage of the wireless signals becomes small. Thus, transmitting signals in a beam mode is able to concentrate energy in a relatively small spatial range and to improve the coverage of the wireless signals in the high frequency bands. In the beam scenario, as the time and position change, a beam pair between a base station and a UE may also change. For example, when in a multiple-TRP (MTRP) scenario, designing a MAC CE to activate a beam state or codepoint for DL, UL, combined DL and UL, or unified DL and UL is not clear. Also, there can be an issue of beam state updating when different types or usage modes correspond to a same codepoint ID in the old and new MAC CEs. Thus, a flexible beam update mechanism is desired.

With unified transmission configuration indicator (TCI) architecture, TCI state can be applied to uplink and downlink, data and control channels (transmissions). For example, the beam state (also referred as TCI state, common TCI state, or common beam state) indicated by a DCI may be applied to at least one of multiple channels (e.g., target transmission), such as physical data shared channel (PDSCH), physical downlink control channel (PDCCH), channel state information reference signal (CSI-RS), physical uplink shared channel (PUSCH), physical uplink control channel (PUCCH), or sounding reference signal (SRS)

The Signaling Framework for Unified Beam State

A UE can receive signaling from gNB (or network), obtain a beam state information, determine usage of the beam state information, and determine transmit or receive parameter for a target signal (or transmission, reception) based on at least one of the beam state information or the usage of the beam state information. The beam state may include a quasi-co-location (QCL) information, a TCI state, spatial relation information, reference signal information, spatial filter information, or precoding information, among others. The target signal or transmission, reception can include at least one of PDSCH, PDCCH, PUCCH, PUSCH, SRS or CSI-RS.

Obtaining the beam state information can be according to at least one of (1) a configured beam state set configured by a RRC signaling, (2) an activated beam state set activated by a MAC CE, or (3) an indicated beam state or indicated beam state set indicated by a DCI signaling.

Figure 3:
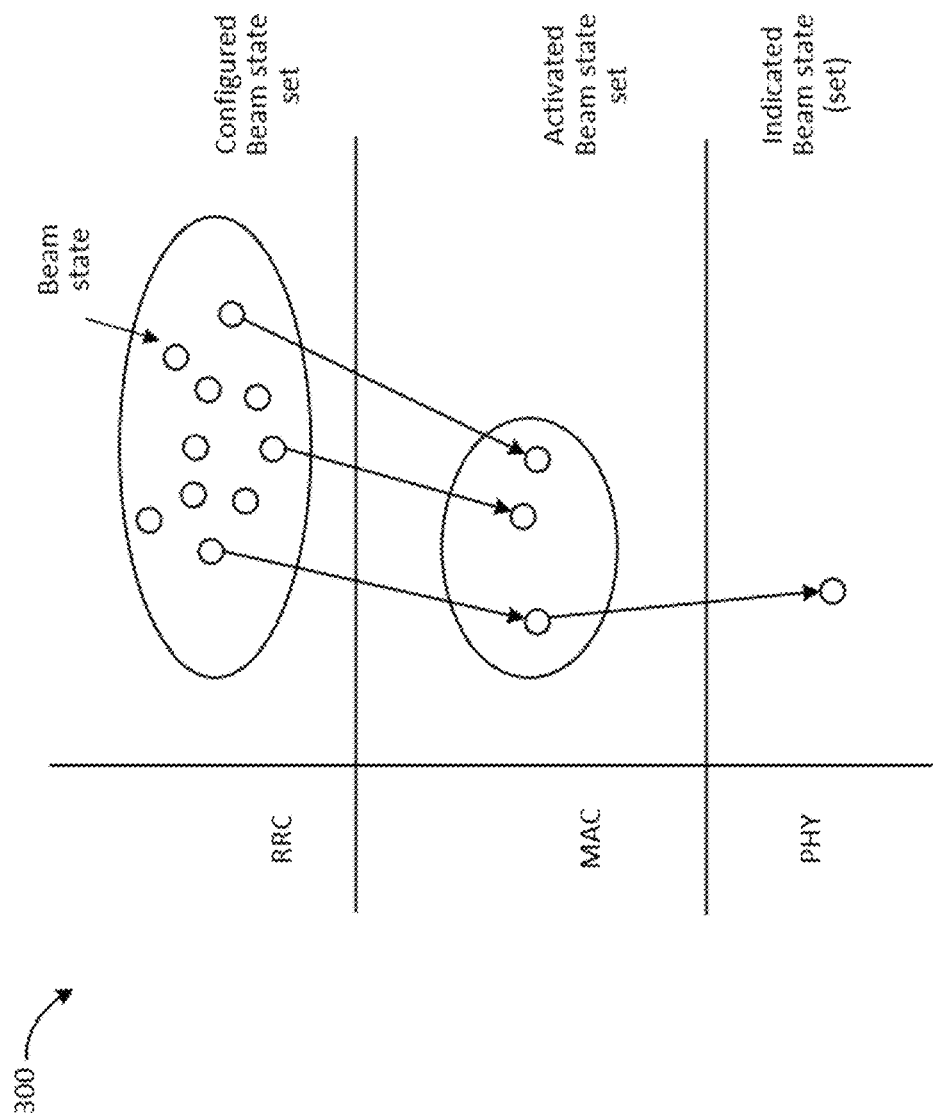
FIG. 3 illustrates an example of a beam state signaling framework, in accordance with some embodiments of the present disclosure.

FIG. 3 illustrates an example of a beam state signaling framework, in accordance with some embodiments of the present disclosure. A beam state is configured, e.g., in a beam state pool, by RRC signaling. A beam state activated in MAC CE can be from the beam state pool. At least one group of beam states can be activated by a MAC CE. A group of beam state corresponding to a codepoint of beam state in MAC CE, can include at least one beam state, and can be indicated by beam state indication field in DCI. For example, a beam state indication field in DCI can indicate a codepoint of beam state in MAC CE, and the codepoint of beam state in MAC CE includes at least one beam state.

Usage of a beam state can be determined according to at least one of: parameters configured for the beam state in a RRC signaling, a usage related to the beam state or a beam state group/codepoint which includes the beam state in a MAC CE, or a value of beam state indication field in a DCI.

A beam state, e.g., a TCI state, can be configured by RRC signaling. A beam state can be determined to be used for DL, UL, or both DL and UL, according to parameter(s) configured for the beam state in the RRC signaling, such as usage configured for the beam state or for a beam state set which includes the beam state, or presence or absent of a specific parameter for the beam state, e.g., UL power control parameter. UL power control parameter may include RS for pathloss (PL-RS), open-loop power control parameter (target receiving power P0, and/or PL compensation factor alpha), or closed-loop power control parameter. The usage of a beam state determined in RRC can be referred as RRC-usage for simplicity.

In the case of common beam state pool, beam states for DL and UL can share a beam state pool, then the beam state for both DL and UL can share the same beam state pool. In this case, usage for a beam state may not be specified in RRC, but may be determined in MAC CE and/or DCI.

Alternatively, in the case of separated beam state pool, beam states for DL and for UL can be grouped into separate beam state pools, then the beam state for both DL and UL can share the same beam state pool with the beam state for DL, or share the same beam state pool with the beam state for UL, or can be grouped into another separated beam state pool.

Further, a beam state can be activated by a MAC CE. A beam state can be determined to be used for DL, UL, or both DL and UL, by information in the MAC CE. The usage of a beam state determined by MAC CE can be referred as MAC-usage for simplicity.

A set of beam states activated in a MAC CE may include at least one beam state group. Each beam state group corresponds to a value of a codepoint of beam state indication field. Usage of beam state is determined by the MAC CE. For example, usage of beam state can be determined by usage mode of codepoint of beam state.

In the case of common beam state pool in RRC, a beam state activated in MAC CE can be from the common beam state pool in RRC. In the case of separate beam state pool in RRC, a beam state activated in MAC CE for DL can be from a beam state pool for DL. A beam state activated in MAC CE for UL can be from a beam state pool for UL. A beam state activated in MAC CE for both DL and UL can be from a beam state pool for both DL and UL.

In some embodiments, in the case of a separate beam state pool in RRC, a beam state activated in MAC CE for DL can be from a beam state pool for DL and/or for both DL and UL. A beam state activated in MAC CE for UL can be from a beam state pool for UL. A beam state activated in MAC CE for both DL and UL can be from a beam state pool for DL and/or for both DL and UL.

Further, a beam state indication field, e.g., transmission configuration indication field, in DCI can indicate at least one codepoint of beam state activated by a MAC CE, and the codepoint of beam state in MAC CE includes at least one beam state. Usage of the indicated beam state can be determined by MAC CE. The indicated beam state can be referred to unified beam state, or common beam state.

When there is only one codepoint of beam state activated in a MAC CE, or when the beam state indication field in DCI is configured not present and it is expected only one codepoint of beam state is activated in a MAC CE, the activated beam state can be referred to unified beam state, or common beam state.

Usage of Beam State when Activated in MAC CE

Beam state for UL and beam state for DL can be selected by MAC CE from a common beam state pool or separate beam state pools in RRC. Beam states are grouped in codepoint by MAC CE, and each codepoint corresponds to a value of beam state indication field in DCI. Type of codepoint of beam state can be one of: DL (or DL only, at least one DL beam state exists in this type of codepoint), UL (or UL only, at least one UL beam state exists in this type of codepoint), combined DL and UL (e.g. at least one DL beam state and at least one UL beam state exists in this type of codepoint), or unified DL and UL (or joint DL and UL, same beam state for DL and UL, at least one beam state exists in this type of codepoint).

In some embodiments, a UE can be configured through RRC signaling, or indicated by MAC CE, by gNB (or network), as "joint" or "separate" for usage indication for beam state ("Example 1"). When "joint" is determined, a beam state can be used for both DL and UL, and the type of codepoint of beam state can be unified DL and UL. When "separate" is determined, a beam state can be used for either DL or for UL, and the type of codepoint of beam state can be one of: DL, UL, combined DL and UL.

In some embodiments, a UE can be configured through RRC signaling, by gNB (or network), as both "joint" and "separate" for usage indication for beam state ("Example 2"). In this case, the type of codepoint of beam state can be one of: DL, UL, combined DL+UL, or unified DL+UL.

The MAC CE may include information to indicate S-DCI (single-DCI) or M-DCI (multiple-DCI), or S-DCI and M-DCI correspond to different types of MAC CEs.

In the case of S-DCI, a DCI can indicate scheduling information for DL or UL transmission, such as DL assignment or UL grant information, for one or more links between UE and gNB (or network). In the case of M-DCI, a DCI may only indicate scheduling information for DL or UL transmission for only one link between UE and gNB. For example, gNB supports 2 TRPs, there are 2 links between 2 TRPs and UE.

In the case of M-DCI, the MAC CE may include information to indicate CORESET pool ID.

In the case of S-DCI, the MAC CE may include information to indicate presence of additional beam state for a second link in a codepoint. The link can be associated with TRP. The information of presence of additional beam state for a second link in a codepoint can indicate presence of additional beam state for a second link in a codepoint for a same usage (DL or UL) as the beam state for a first link.

Figure 4:
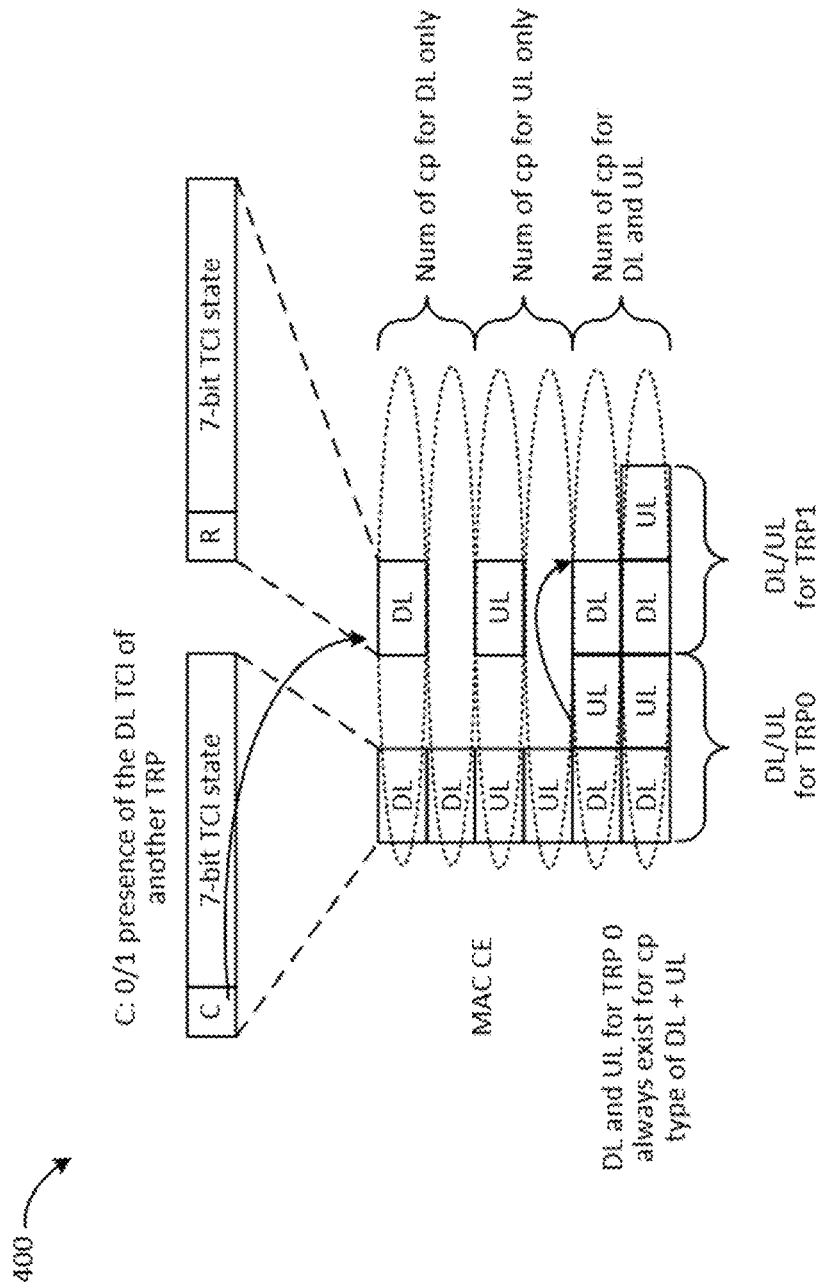
FIG. 4 illustrates a diagram of examples of MAC CE and corresponding beam state indications, in accordance with some embodiments of the present disclosure.

Referring to FIG. 4, for Example 1 and when "separate" is determined, and mTRP is supported with S-DCI, a beam state entry (byte) may include a "C" or "R" bit and corresponding beam state indication, e.g., TCI state indication (7-bit). A beam state can be for DL or for UL. The type of a codepoint of beam state may include DL, UL, or combined DL and UL. A codepoint (cp) of beam state may include one DL or UL beam state, two DL or UL beam states for two links (e.g., TRP0 and TRP1), two DL and one UL beam states, two UL and one DL beam states, or two DL and two UL beam states. The "C" bit in the beam state entry for a first link indicates presence of additional beam state for a second link in a codepoint with the same usage as the beam state for the first link.

One of the following methods can be used to indicate type of each codepoint of beam state, if the number of candidate types is larger than 1 for the MAC CE.

In a first method, for each codepoint, one out of candidate types can be determined (e.g., indicated). For Example 1, when "joint" is determined, there is only one candidate type, e.g., unified DL and UL, so there is no need to indicate type for each codepoint. For Example 1, when "separate" is determined, there are 3 candidate types, so a 2-bit type indication can be used for each codepoint. In some embodiments, there are 4 candidate types, and 2-bit type indication can be used for each codepoint.

In a second method, numbers of each candidate type can be indicated. The codepoints in the MAC CE are organized in a predefined order of type, e.g., DL, UL, combined DL and UL, and unified DL and UL. The number of codepoints with a type can be one of integer from 0 to the maximum of number of codepoints with the type. For example, when the maximum numbers of codepoints for each candidate types are all 4, then 3 bits can be used for indication of the number of codepoints for each type, e.g. one of 0, 1, 2, 3, or 4.

For example, a predefined order of types is: DL, UL, combined DL and UL, unified DL and UL. However, embodiments are not limited thereto, and any order can be contemplated. In this example, the number of codepoints for the first Type (DL) is 1 (N1), the number of codepoints for the second Type (UL) is 2 (N2), the number of codepoints for the third Type (combined DL and UL) is 3 (N3), and the number of codepoints for the fourth Type (unified DL and UL) is 4 (N4), where each of N1, N2, N3, N4 is one of integer from 0 to the maximum of number of codepoints with the corresponding type.

In order to further reduce overhead of indication of types of codepoints, the number of codepoints with a type that is the last one according to the predefined order of type can be absent. For example, when there are 4 candidate types, it only needs to indicate the numbers of codepoints for the first 3 candidate types, and the number of codepoints for the last candidate type can be deduced according to the length of MAC CE and the number of codepoints for the first 3 candidate types.

In a third method, numbers of each candidate type can be jointly indicated. The MAC CE includes a joint indication of numbers of codepoints for each candidate type. The relation between the value of the joint indication of numbers of each candidate beam states and numbers of codepoints for each candidate type can be predefined.

Referring to FIG. 5, Table 500 shows the number of combinations of the 3 candidate types for Example 1, when "separate" is determined, in accordance with some embodiments of the present disclosure. There are a total of 165 combinations, so 8 bits can be used for the joint indication of numbers of codepoints for each candidate type. Numbers in square brackets can be for the case that the number of codepoints for UL is up to 4. Numbers not in square brackets can be for the case that the number of codepoints for UL is up to 8. Number of other type than UL can be up to 8 in this example, but embodiments are not limited thereto.

In order to further reduce overhead of indication of types of codepoints, the number of codepoints with a type that is the last one according to the predefined order of type can be absent. The number of codepoints for the last candidate type can be deduced according to the length of MAC CE and the number of codepoints for the first N−1 candidate types, where N is the number of candidate types.

Referring to FIG. 6, Table 600 is a simplified version of Table 500 of FIG. 5, in accordance with some embodiments of the present disclosure. In Table 600, there are only 45 combinations which can be represented with 6 bits for the joint indication of numbers of codepoints for each candidate type. Numbers in square brackets can be for the case that the number of codepoints for UL is up to 4. Numbers not in square brackets can be for the case that the number of codepoints for UL is up to 8. Number of other type than UL can be up to 8, but embodiments are not limited thereto.

With the reduced overhead of the third method, Table 500 can be used for Example 2 where there are 4 candidate types. Only the numbers of first 3 types can be indicated, and the number of last candidate type can be deduced, but embodiments are not limited thereto.

TCI Updating with One MAC CE and Multiple DCIs

As mentioned above, with a MAC CE activating at least one codepoint of beam states, DCI can indicate one codepoint. At least one beam state of the indicated codepoint can be applied to DL or UL according to the usage of the beam state. DL beam state can be applied to DL transmission, and UL beam state can be applied to UL transmission.

Figure 7:
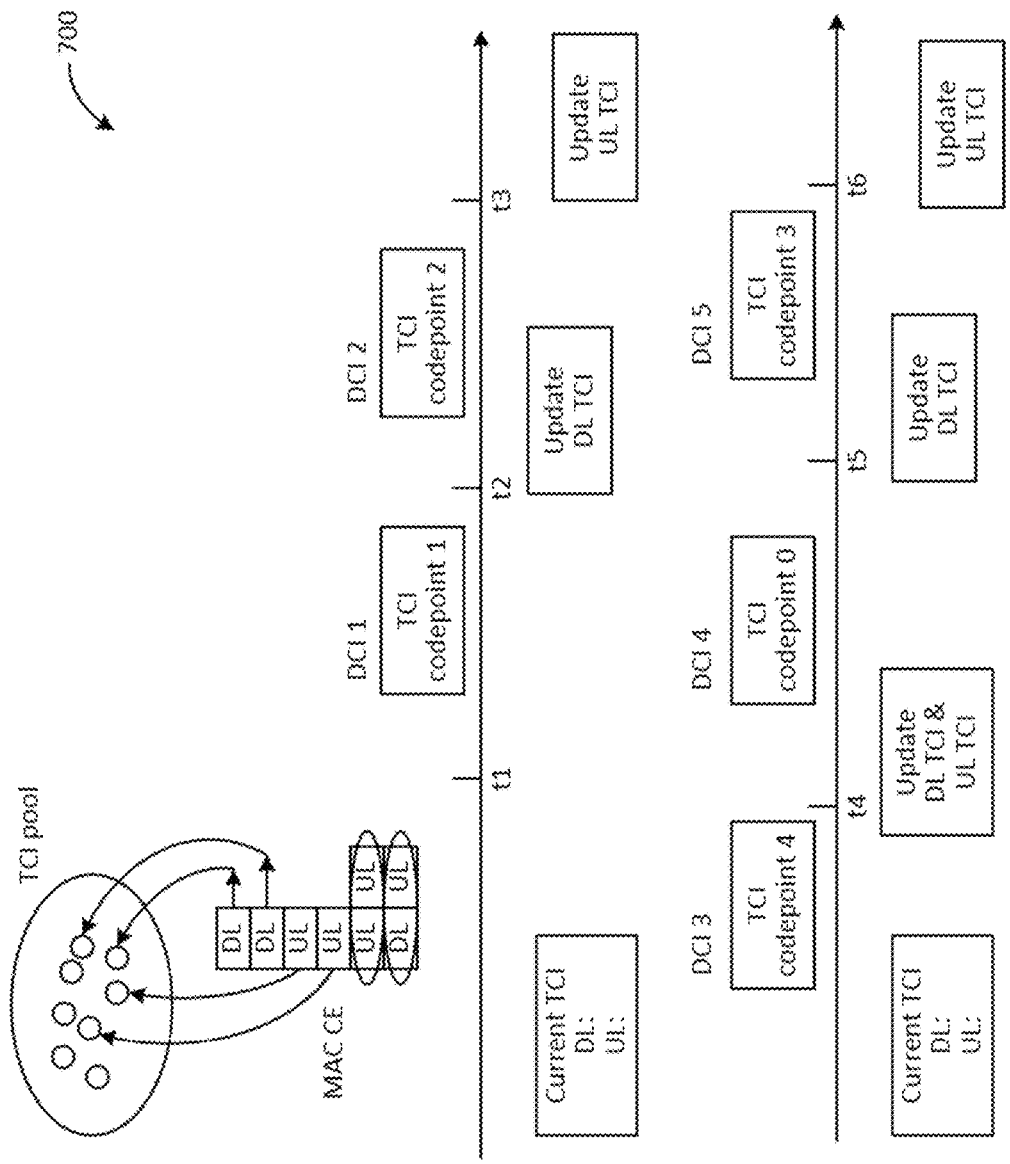
FIG. 7 shows a diagram of an instance when TCI is updated with one MAC CE and multiple DCIs, in accordance with some embodiments of the present disclosure.

FIG. 7 shows a diagram of an instance when TCI is updated with one MAC CE and multiple DCIs, in accordance with some embodiments of the present disclosure. As shown in FIG. 7, the beam state is TCI state and simplified as "TCI" in the figure. A MAC CE can activate a set of codepoints of beam states (e.g., TCI state) which are applicable at or after time t1. A DCI 1 which indicates codepoint 1 of TCI state can include a DL TCI state. This DL TCI state can be applicable at or after time t2 to DL target transmission. A DCI 2 which can indicate codepoint 2 of TCI state can include a UL TCI state. This UL TCI state can be applicable at or after time t3 to UL target transmission. A DCI 3 which indicates codepoint 4 of TCI state can include a DL TCI state and a UL TCI state, and the DL TCI state and the UL TCI state can be applicable to DL target transmission and UL target transmission respectively at or after time t4.

Activating beam state by MAC CE and indicating beam state by DCI can work in parallel. When a DCI indicates at least one beam state with a beam state codepoint ID, the beam states can be applicable for target transmission(s). Then a new MAC CE can activate a new set of beam states, whether the beam states for the target transmission(s) is updated according to the new MAC CE. Generally, the beam states can be updated according to the new beam state(s) activated using the same codepoint ID in the new MAC CE. However, the following issues may be considered:

Issue 1: for a given codepoint ID indicated in the old DCI, the type of codepoint may not be same between the old MAC CE and the new MAC CE. For example, for a given TCI codepoint ID 2, in the old MAC CE, it can be a TCI codepoint of DL only, but in new MAC CE, it can be a TCI codepoint of UL only.

Issue 2: no codepoint ID indicated in the old DCI is present in the new MAC CE. For example, when DCI indicates TCI codepoint ID 2 for example, a MAC CE can update a TCI set with only 2 TCI codepoints, with ID of 0 and 1, and no ID 2 is present.

Therefore, in some embodiments, the given codepoint ID (in last DCI) in a new MAC CE may not be used directly.

There is an active beam state set which is organized in codepoints, each codepoint corresponding to at least one beam state. The active beam state set can be maintained by MAC CE. A new MAC CE activating a new beam state set can update the old beam state set. A DCI can indicate a codepoint value which is actually a pointer for determining beam state for current or upcoming target transmission. The pointer can be updated by a new DCI which indicates a codepoint value. The pointer can be referred as a current beam state pointer or a beam state pointer for simplicity. The pointer which is actually a beam state codepoint ID can be used to determine beam state by looking up the latest/newest/current active beam state set (which can be seen as a table).

The pointers for DL and UL can be separate if the UE is not indicated beam states for DL and UL in a joint or unified way, e.g., "separate" for usage indication for beam state. That can mean a beam state applied to DL can be different from that for UL.

Given the above issues, when the given codepoint ID (in last DCI) in a new MAC CE is not used directly, the pointer may need to be updated.

One or more of these schemes may be implemented to resolve the issue(s):

A pointer can be set to a predetermined value according to a MAC CE which activates a beam state set (Scheme 1). The predetermined value can be one of following:

(1) A predefined value, such as 0, 1, etc. For example, pointer for DL and pointer for UL are both set to the predefined value in the case of "separate" for usage indication for beam state or in the case of "joint" for usage indication for beam state. As another example, the pointer for DL and UL is set to the predefined value in the case of "joint" for usage indication for beam state.

(2) A lowest (first) or highest (last) codepoint ID in the MAC CE. The gNB or network may guarantee or UE can expect that the lowest (first) or highest (last) codepoint ID in the MAC CE corresponds to at least one beam state for DL and at least one beam state for UL. For example, the pointer for DL and pointer for UL are both set to the lowest (first) or highest (last) codepoint ID in the MAC CE in the case of "separate" for usage indication for beam state or in the case of "joint" for usage indication for beam state. As another example, the pointer for DL and UL is set to the lowest (first) or highest (last) codepoint ID in the MAC CE in the case of "joint" for usage indication for beam state.

(3) A lowest (first) or highest (last) codepoint ID in the MAC CE with certain condition. The certain condition may refer to a lowest (first) or highest (last) codepoint ID among the codepoints in the MAC CE each of which corresponds to at least one DL beam state and at least one beam state for UL; e.g., in a beam state codepoint with type of combined DL and UL, and/or joint DL and UL. For example, the pointer for DL and pointer for UL are both set to the lowest (first) or highest (last) codepoint ID in the MAC CE with this certain condition in the case of "separate" for usage indication for beam state or in the case of "joint" for usage indication for beam state. As another example, the pointer for DL and UL is set to the lowest (first) or highest (last) codepoint ID in the MAC CE with this certain condition in the case of "joint" for usage indication for beam state.

For a pointer for DL, the certain condition may refer to a lowest (first) or highest (last) codepoint ID among the codepoints in the MAC CE each of which corresponds to at least one DL beam state. For example, in a beam state codepoint with type of DL, combined DL and UL, and/or joint DL and UL. As another example, the pointer for DL is set to the lowest (first) or highest (last) codepoint ID in the MAC CE with this certain condition in the case of "separate" for usage indication for beam state.

For a pointer for UL, the certain condition may refer to a lowest (first) or highest (last) codepoint ID among the codepoints in the MAC CE each of which corresponds to at least one UL beam state. For example, in a beam state codepoint with type of UL, combined DL and UL, and/or joint DL and UL. As another example, the pointer for UL is set to the lowest (first) or highest (last) codepoint ID in the MAC CE with this certain condition in the case of "separate" for usage indication for beam state.

Regarding application time(s), a pointer can be set to a certain value according to a MAC CE which activates a beam state set which can be applied to a pointer starting from the first slot that is after an applicable time. The applicable time can be the time when the activated beam state in the MAC CE is applicable (or used). In some embodiments, the applicable time can be determined as follows: when the UE would transmit a PUCCH with HARQ-ACK information in slot n corresponding to the PDSCH carrying the activation command (e.g., the MAC CE which sub activates a beam state set), the applicable time is slot $n+3N_{slot}^{subframe,\mu}$ where $\mu$ is the SCS configuration for the PUCCH, and $N_{slot}^{subframe,\mu}$ is the number of slots a subframe contains.

When one or more of the following conditions is not met, Scheme 1 can be used. Otherwise, the pointer is not changed (Scheme 2). A first condition includes when the new MAC CE has same structure as the old MAC CE, which means the number of beam state codepoints are the same, and types of each beam state codepoint are the same. A second condition includes when the pointer corresponds to the same type for the beam state codepoint ID in the old MAC CE and in the new MAC CE.

And, the beam states for the target transmission(s) can be updated according to the beam state(s) activated by the new MAC CE, using a changed or an unchanged pointer.

If the beam state codepoint corresponding to the pointer includes DL beam state(s) and UL beam state(s), DL beam state(s) and UL beam state(s) can be applied to DL transmission and UL transmission, respectively.

In order to indicate the usage of each activated beam state in MAC CE, joint coding for numbers of different types (usage modes) for beam state codepoints in MAC CE can be used. To solve the issue of beam state updating when different types (usage mode) correspond to a same codepoint ID in old and new MAC CE, certain (e.g. first, or last) beam state or codepoint ID for DL and/or UL beam state can be applied for the target transmission. Further condition may be needed, e.g., when the type of the codepoint (indicated by the last DCI) in the old MAC CE is different from that in new MAC CE.

Figure 8:
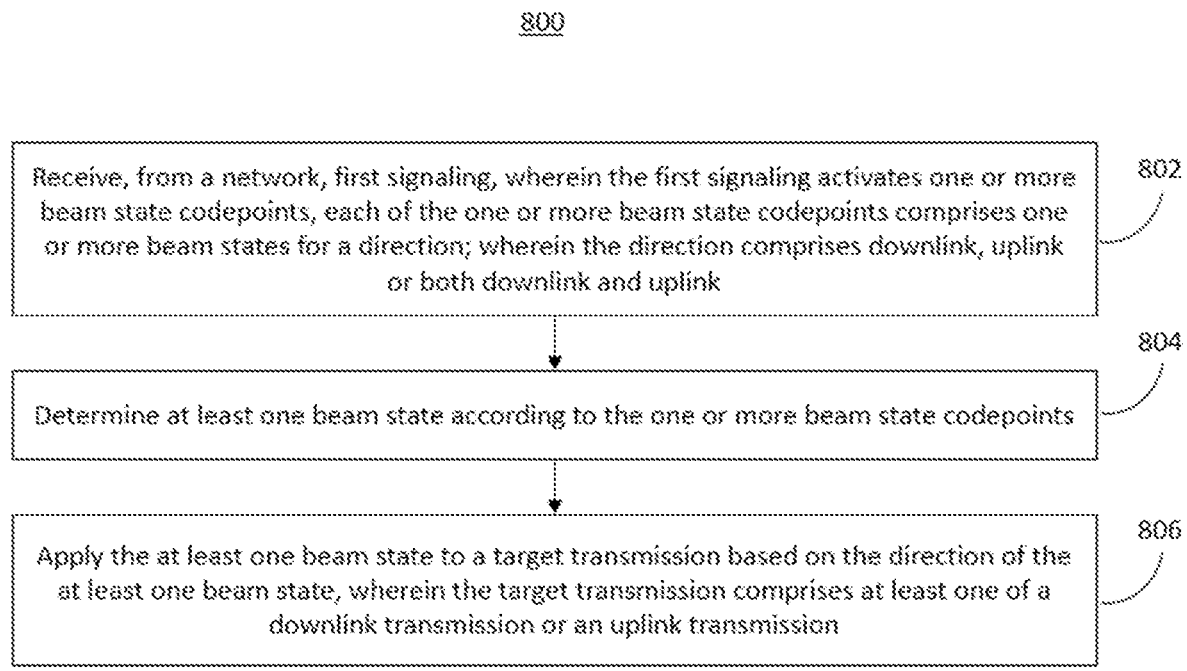

FIG. 8 illustrates a flow chart of an example wireless communication process 800 according to some embodiments. The process 800 is performed by the UE. The process 800 includes receiving, by a wireless communication device from a network, first signaling (802). The first signaling activates one or more beam state codepoints, and each of the one or more beam state codepoints includes one or more beam states for a direction. The direction includes downlink, uplink or both downlink and uplink. The process 800 includes determining, by the wireless communication device, at least one beam state according to the one or more beam state codepoints (804). The process includes applying, by the wireless communication device, the at least one beam state to a target transmission based on the direction of the at least one beam state (806). The target transmission includes at least one of a downlink transmission or an uplink transmission.

Figure 9:
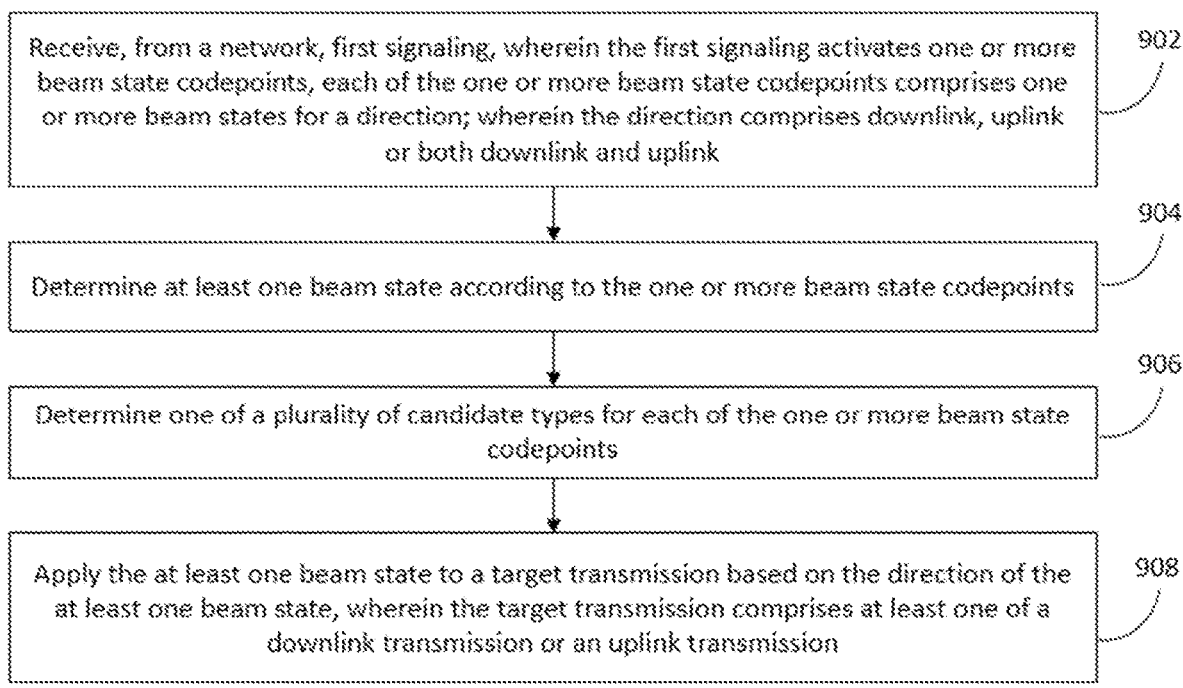

FIG. 9 illustrates a flow chart of an example wireless communication process 900 according to some embodiments. The process 900 is performed by the UE. The process 900 includes receiving, by a wireless communication device from a network, first signaling (902). The first signaling activates one or more beam state codepoints, and each of the one or more beam state codepoints includes one or more beam states for a direction. The direction includes downlink, uplink or both downlink and uplink. The process 900 includes determining, by the wireless communication device, at least one beam state according to the one or more beam state codepoints (904). The process 900 includes determining one of a plurality of candidate types for each of the one or more beam state codepoints (906). The process 900 includes applying, by the wireless communication device, the at least one beam state to a target transmission based on the direction of the at least one beam state (908). The target transmission includes at least one of a downlink transmission or an uplink transmission.

Figure 10:
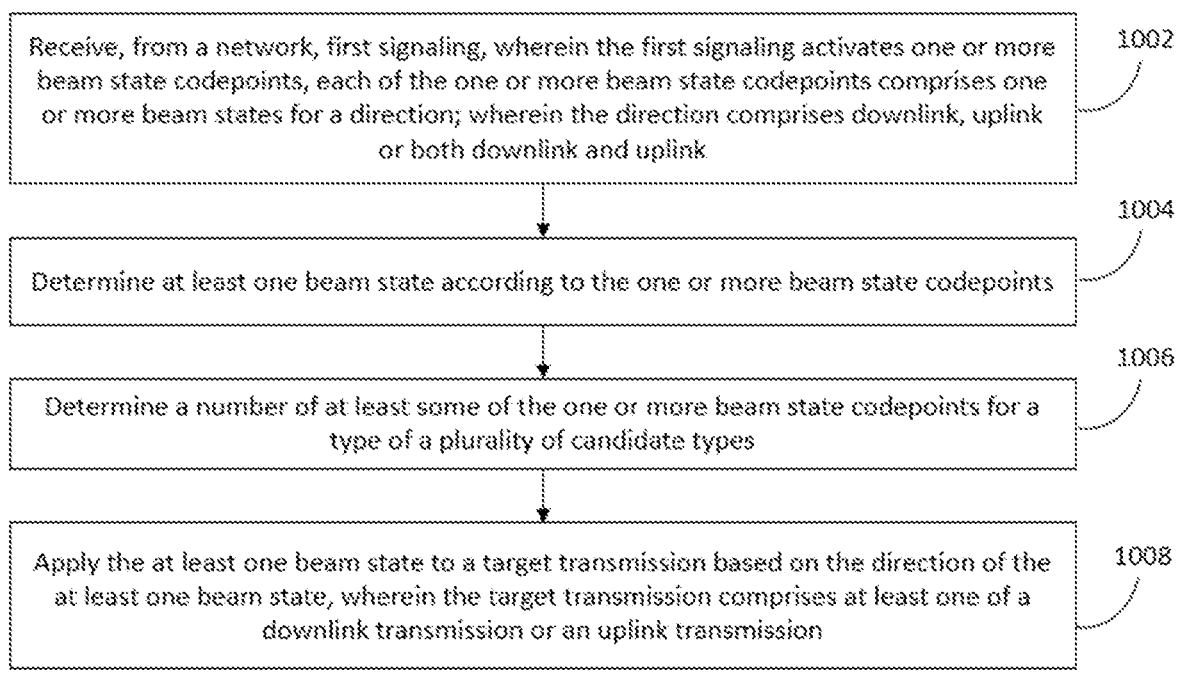

FIG. 10 illustrates a flow chart of an example wireless communication process 1000 according to some embodiments. The process 1000 is performed by the UE. The process 1000 includes receiving, by a wireless communication device from a network, first signaling (1002). The first signaling activates one or more beam state codepoints, and each of the one or more beam state codepoints includes one or more beam states for a direction. The direction includes downlink, uplink or both downlink and uplink. The process 1000 includes determining, by the wireless communication device, at least one beam state according to the one or more beam state codepoints (1004). The process 1000 includes determining a number of at least some of the one or more beam state codepoints for a type of a plurality of candidate types (1006). The process 1000 includes applying, by the wireless communication device, the at least one beam state to a target transmission based on the direction of the at least one beam state (1008). The target transmission includes at least one of a downlink transmission or an uplink transmission.

In some embodiments, indication for one or more numbers of one or more second beam state codepoints of the one or more beam state codepoints for one or more second candidate types of the plurality of candidate types is omitted.

In some embodiments, only one bit corresponding to the first beam state indicates presence of the second beam state for the same direction. For one direction, at most 2 beam states for a direction in a beam state codepoint. So there may not be a need to attach a presence indicator for the second beam state for a direction.

In some embodiments, one, two or more beam states for a direction are present in a beam state codepoint. Even the last beam state for a direction may correspond to a bit which indicates no more beam state after this beam state for this direction in this codepoint.

In some embodiments, a point for the downlink transmission has the same value for a point for the uplink transmission.

In some embodiments, wherein the first pointer is determined by at least one of values (e.g., the first pointer can be one of the following codepoint ID, or 2 codepoint IDs (for DL and UL separately)) as: a predefined or configured integer; an indicated value related to beam state in a DCI (e.g., by a DCI field "Transmission Configuration Indication (TCI)"); a lowest or a first codepoint ID in the one or more codepoint IDs in the first signaling; a highest or a last codepoint ID in the one or more codepoint IDs in the first signaling; a codepoint ID corresponds to a first or a last beam state codepoint of the one or more beam state codepoints having a combined downlink and uplink type or a joint downlink and uplink type in the first signaling; a codepoint ID corresponds to a first or a last beam state codepoint of the one or more beam state codepoints having an uplink type, a combined downlink and uplink type, or a joint downlink and uplink type in the first signaling; or a codepoint ID corresponds to a first or a last beam state codepoint of the one or more beam state codepoints having a downlink type, a combined downlink and uplink type, or a joint downlink and uplink type in the first signaling.

In some embodiments, the applicable time of the first signaling is determined by at least one of a transmit time of a HARQ-ACK information corresponding to the first signaling (e.g., the slot where the UE transmits a PUCCH with HARQ-ACK information corresponding to the PDSCH carrying the activation command) or a predefined or configured time period (e.g., X subframes, or X ms. where X is an integer such as 1, 3, etc. (e.g., an odd integer)). However, these numbers are an example and embodiments are not limited thereto, and the integers can be any positive integer.

In some embodiments, the applicable time of the DCI is determined by at least one of a transmit time of a HARQ-ACK information corresponding to the DCI (e.g., the slot where the UE transmits a PUCCH or PUSCH with HARQ-ACK information corresponding to the DCI) or a predefined or configured time period (e.g., X subframes, X ms, or Y symbols (e.g. OFDM symbols), where X can be an integer such as 1, 3, etc. (e.g., an odd integer) and Y can be an integer such as 14, 28, etc. (e.g., an integer that is a multiple of 14)). However, these numbers are an example and embodiments are not limited thereto, and the integers can be any positive integer.

Figure 11:
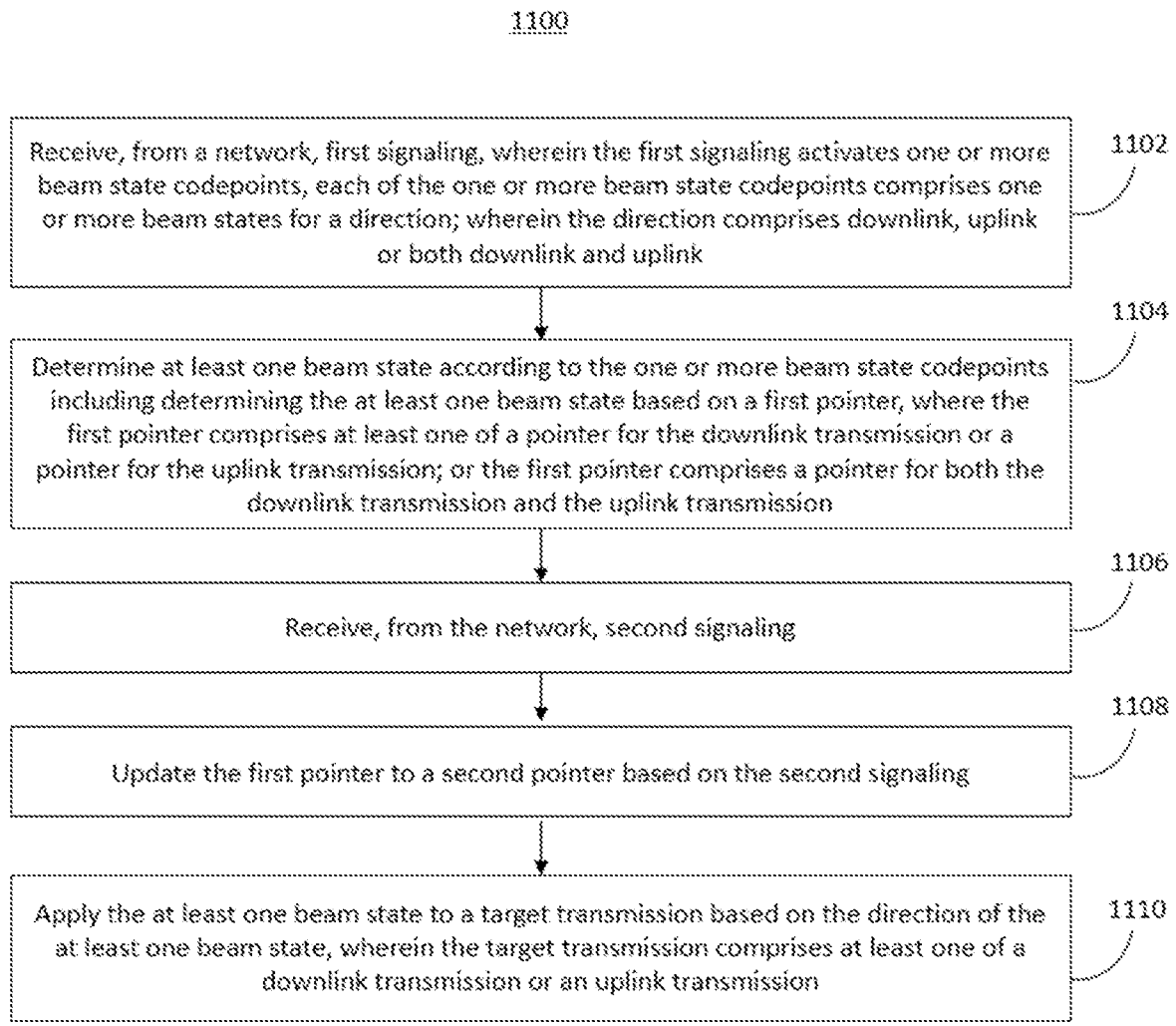

FIG. 11 illustrates a flow chart of an example wireless communication process 1100 according to some embodiments. The process 1100 is performed by the UE. The process 1100 includes receiving, by a wireless communication device from a network, first signaling (1102). The first signaling activates one or more beam state codepoints, and each of the one or more beam state codepoints includes one or more beam states for a direction. The direction includes downlink, uplink or both downlink and uplink. The process 1100 includes determining, by the wireless communication device, at least one beam state according to the one or more beam state codepoints (1104). The first pointer includes at least one of a pointer for the downlink transmission or a pointer for the uplink transmission; or the first pointer includes a pointer for both the downlink transmission and the uplink transmission. The process 1100 includes receiving, from the network, second signaling (1006). The process 1100 includes updating the first pointer to a second pointer based on the second signaling (1008). The process 1100 includes applying, by the wireless communication device, the at least one beam state to a target transmission based on the direction of the at least one beam state (1110). The target transmission includes at least one of a downlink transmission or an uplink transmission.

In some embodiments, the second pointer is determined by at least one of values (e.g., the second pointer can be one of the following codepoint ID, or 2 codepoint IDs (for DL and UL separately)) as: a predefined or configured integer; a lowest or a first codepoint ID in the one or more codepoint IDs in the second signaling; a highest or a last codepoint ID in the one or more codepoint IDs in the second signaling; a codepoint ID corresponds to a first or a last beam state codepoint of the one or more beam state codepoints having a combined downlink and uplink type or a joint downlink and uplink type in the second signaling; a codepoint ID corresponds to a first or a last beam state codepoint of the one or more beam state codepoints having an uplink type, a combined downlink and uplink type, or a joint downlink and uplink type in the second signaling; or a codepoint ID corresponds to a first or a last beam state codepoint of the one or more beam state codepoints having a downlink type, a combined downlink and uplink type, or a joint downlink and uplink type in the second signaling.

FIG. 12 illustrates a flow chart of an example wireless communication process 1200, according to some embodiments. The process 1200 is performed by the TRP. The process 1200 includes transmitting, to a wireless communication device, first signal (1202). The first signaling activates one or more beam state codepoints, each of the one or more beam state codepoints includes one or more beam states for a direction, and the direction includes downlink, uplink or both downlink and uplink. The process 1200 can include communicating, with the wireless communication device, a target transmission by applying at least one beam state based on the direction (1204). The target transmission includes at least one of a downlink transmission or an uplink transmission.

In some embodiments, the network transmits one or more beam state codepoints, then one codepoint is determined by a DCI or implicitly (first codepoint or other ways). Then the network communicates transmission with the UE using the determined beam states.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules. However, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A wireless communication method, comprising:
receiving, by a wireless communication device from a network, first signaling, wherein the first signaling activates one or more beam state codepoints, each of the one or more beam state codepoints comprises one or more beam states for a direction, wherein the direction comprises downlink, uplink or both downlink and uplink;
determining, by the wireless communication device, at least one beam state according to the one or more beam state codepoints, wherein determining the at least one beam state according to the one or more beam state codepoints comprises determining the at least one beam state based on a first pointer, wherein the first pointer comprises at least one of:
a pointer for a downlink transmission or a pointer for an uplink transmission; or
a pointer for both the downlink transmission and the uplink transmission; and applying, by the wireless communication device, the at least one beam state to a target transmission based on the direction of the at least one beam state, wherein the target transmission comprises at least one of the downlink transmission or the uplink transmission.

2. The method of claim 1, wherein the first signaling comprises a Medium Access Control (MAC) Control Element (CE).

3. The method of claim 1, further comprising determining one of a plurality of candidate types for each of the one or more beam state codepoints, wherein the candidate type comprises at least one of downlink (DL), uplink (UL), combined DL and UL, or joint DL and UL.

4. The method of claim 1, wherein the one or more beam state codepoints are organized in a predefined order according to the plurality of candidate types.

5. The method of claim 1, further comprising determining a number of at least some of the one or more beam state codepoints for a type of a plurality of candidate types.

6. The method of claim 5,
wherein the number of the some of the one or more beam state codepoints for each type of the plurality of candidate types is indicated using an integer; or
wherein the numbers of the one or more beam state codepoints for all of the plurality of candidate types are jointly indicated using an integer; or
wherein the numbers of the one or more beam state codepoints for some of the plurality of candidate types are jointly indicated using an integer.

7. The method of claim 1, wherein:
the first signaling comprises a presence indicator, wherein the presence indicator corresponds to a first one of the one or more beam state for a direction in a corresponding beam state codepoint, the presence indicator indicates a presence of a second beam state with the same direction in the same beam state codepoint; or the first signaling comprises a presence indicator, wherein the presence indicator corresponds to each of the one or more beam states for a direction in a corresponding beam state codepoint, the presence indicator indicates a presence of another beam state with the same direction in the same beam state codepoint.

8. The method of claim 1, wherein:
the at least one beam state is determined as at least one beam state corresponding to a beam state codepoint with a codepoint identifier (ID) determined by the first pointer.

9. The method of claim 1, wherein the first pointer is determined by at least one of values as:
a predefined or configured integer;
an indicated value related to beam state in a downlink control information (DCI);
a lowest or a first codepoint ID in the one or more codepoint IDs in the first signaling;
a highest or a last codepoint ID in the one or more codepoint IDs in the first signaling;
a codepoint ID corresponds to a first or a last beam state codepoint of the one or more beam state codepoints having a combined downlink and uplink type or a joint downlink and uplink type in the first signaling;
a codepoint ID corresponds to a first or a last beam state codepoint of the one or more beam state codepoints having an uplink type, a combined downlink and uplink type, or a joint downlink and uplink type in the first signaling; or
a codepoint ID corresponds to a first or a last beam state codepoint of the one or more beam state codepoints having a downlink type, a combined downlink and uplink type, or a joint downlink and uplink type in the first signaling.

10. The method of claim 9, wherein:
the first pointer is determined by the at least one of values when or after an applicable time of the first signaling; or
the first pointer is determined by the at least one of values starting from the first slot that is after an applicable time of the first signaling.

11. The method of claim 10, wherein the applicable time of the first signaling is determined by at least one of a transmit time of a hybrid automatic repeat request acknowledgement (HARQ-ACK) information corresponding to the first signaling or a predefined or configured time period.

12. The method of claim 1, further comprising:
receiving, by the wireless communication device from the network, second signaling;
updating the first pointer to a second pointer based on the second signaling, wherein the second signaling comprises a Medium Access Control (MAC) Control Element (CE).

13. The method of claim 12, wherein the second pointer is determined by at least one of values as:
a predefined or configured integer;
a lowest or a first codepoint ID in the one or more codepoint IDs in the second signaling;
a highest or a last codepoint ID in the one or more codepoint IDs in the second signaling;
a codepoint ID corresponds to a first or a last beam state codepoint of the one or more beam state codepoints having a combined downlink and uplink type or a joint downlink and uplink type in the second signaling;
a codepoint ID corresponds to a first or a last beam state codepoint of the one or more beam state codepoints having an uplink type, a combined downlink and uplink type, or a joint downlink and uplink type in the second signaling; or
a codepoint ID corresponds to a first or a last beam state codepoint of the one or more beam state codepoints having a downlink type, a combined downlink and uplink type, or a joint downlink and uplink type in the second signaling.

14. The method of claim 12, wherein
a first number of the one or more beam state codepoints in the first signaling and a second number of one or more beam state codepoints in the second signaling are different; or
types of each of the one or more beam state codepoints in the first signaling and types of each of the one or more beam state codepoints in the second signaling are not same.

15. A wireless communication method, comprising:
receiving, by a wireless communication device from a network, first signaling, wherein the first signaling activates one or more beam state codepoints, each of the one or more beam state codepoints comprises one or more beam states for a direction, wherein the direction comprises downlink, uplink or both downlink and uplink;
determining, by the wireless communication device, at least one beam state according to the one or more beam state codepoints;
determining a number of at least some of the one or more beam state codepoints for a type of a plurality of candidate types; and
applying, by the wireless communication device, the at least one beam state to a target transmission based on the direction of the at least one beam state, wherein the target transmission comprises at least one of a downlink transmission or an uplink transmission, wherein:
one or more numbers of one or more first beam state codepoints of the one or more beam state codepoints for one or more first candidate types of the plurality of candidate types are jointly indicated using an integer; and a number of the one or more first candidate types is less than a number of the plurality of candidate types.

16. The method of claim 15, wherein the one or more first beam state codepoints are before the one or more second beam state codepoints according to a predefined order, wherein the one or more second beam state codepoints are beam state codepoints other than the one or more first beam state codepoints in the first signaling.

17. A wireless communication method, comprising,
transmitting, by a network to a wireless communication device, first signaling, wherein the first signaling activates one or more beam state codepoints, each of the one or more beam state codepoints comprises one or more beam states for a direction, wherein the direction comprises downlink, uplink or both downlink and uplink, wherein
the first signaling comprises a presence indicator, wherein the presence indicator corresponds to a first one of the one or more beam state for a direction in a corresponding beam state codepoint, the presence indicator indicates a presence of a second beam state with the same direction in the same beam state codepoint; or
the first signaling comprises a presence indicator, wherein the presence indicator corresponds to each of the one or more beam states for a direction in a corresponding beam state codepoint, the presence indicator indicates a presence of another beam state with the same direction in the same beam state codepoint; and communicating, by the network with the wireless communication device, a target transmission by applying at least one beam state based on the direction, wherein the target transmission comprises at least one of a downlink transmission or an uplink transmission.

18. A wireless communication device, comprising:
at least one processor configured to:
- receive, via a transceiver from a network, first signaling, wherein the first signaling activates one or more beam state codepoints, each of the one or more beam state codepoints comprises one or more beam states for a direction, wherein the direction comprises downlink, uplink or both downlink and uplink;
- determine at least one beam state according to the one or more beam state codepoints, wherein determining the at least one beam state according to the one or more beam state codepoints comprises determining the at least one beam state based on a first pointer, wherein the first pointer comprises at least one of:
  - a pointer for a downlink transmission or a pointer for an uplink transmission; or
  - a pointer for both the downlink transmission and the uplink transmission; and
- apply the at least one beam state to a target transmission based on the direction of the at least one beam state, wherein the target transmission comprises at least one of the downlink transmission or the uplink transmission.

19. A network node, comprising,
at least one processor configured to:
- transmit, via a transceiver to a wireless communication device, first signaling, wherein the first signaling activates one or more beam state codepoints, each of the one or more beam state codepoints comprises one or more beam states for a direction, wherein the direction comprises downlink, uplink or both downlink and uplink, wherein
  - the first signaling comprises a presence indicator, wherein the presence indicator corresponds to a first one of the one or more beam state for a direction in a corresponding beam state codepoint, the presence indicator indicates a presence of a second beam state with the same direction in the same beam state codepoint; or
  - the first signaling comprises a presence indicator, wherein the presence indicator corresponds to each of the one or more beam states for a direction in a corresponding beam state codepoint, the presence indicator indicates a presence of another beam state with the same direction in the same beam state codepoint; and
- communicate, via the transceiver with the wireless communication device, a target transmission by applying at least one beam state based on the direction, wherein the target transmission comprises at least one of a downlink transmission or an uplink transmission.

\* \* \* \* \*